(12) United States Patent
Kuznetsov et al.

(10) Patent No.: US 9,697,710 B2
(45) Date of Patent: Jul. 4, 2017

(54) MULTI-THREAT DETECTION SYSTEM

(71) Applicants: Andrey Kuznetsov, St. Petersburg (RU); Valery Averyanov, St. Petersburg (RU); Igor Gorshkov, St. Petersburg (RU)

(72) Inventors: Andrey Kuznetsov, St. Petersburg (RU); Valery Averyanov, St. Petersburg (RU); Igor Gorshkov, St. Petersburg (RU)

(73) Assignee: APSTEC SYSTEMS USA LLC, Owings Mills, MD (US)

( * ) Notice: Subject to any disclaimer, the term of this patent is extended or adjusted under 35 U.S.C. 154(b) by 117 days.

(21) Appl. No.: 14/964,328

(22) Filed: Dec. 9, 2015

(65) Prior Publication Data
US 2016/0117898 A1    Apr. 28, 2016

Related U.S. Application Data

(63) Continuation-in-part of application No. 14/160,895, filed on Jan. 22, 2014, now Pat. No. 9,282,258, and a continuation-in-part of application No. 13/528,412, filed on Jun. 20, 2012, now Pat. No. 9,304,190, and a continuation-in-part of application No. 14/319,222, filed on Jun. 30, 2014, application No. 14/964,328, which is a continuation-in-part of application No.
(Continued)

(51) Int. Cl.
*G08B 13/196* (2006.01)
*G08B 21/02* (2006.01)
*G06K 9/00* (2006.01)
*H04N 5/30* (2006.01)
*H04N 13/02* (2006.01)
*H04N 5/32* (2006.01)

(52) U.S. Cl.
CPC ....... *G08B 13/196* (2013.01); *G06K 9/00771* (2013.01); *G08B 21/02* (2013.01); *H04N 5/30* (2013.01); *H04N 5/32* (2013.01); *H04N 13/0239* (2013.01); *G06K 2209/09* (2013.01)

(58) Field of Classification Search
None
See application file for complete search history.

(56) References Cited

U.S. PATENT DOCUMENTS

2007/0133844 A1\* 6/2007 Waehner ............. G06K 9/2036
                                                         382/118
2007/0146720 A1\* 6/2007 Cox ..................... G01J 3/2823
                                                         356/451
(Continued)

*Primary Examiner* — Eileen Adams
(74) *Attorney, Agent, or Firm* — Nadya Reingand; Yan Hankin

(57) ABSTRACT

The present invention is a multi-modal security checkpoint. The security checkpoint can simultaneously scan for and identify hidden metallic (weapon and shrapnel), non-metallic (explosives and IED), and radioactive/nuclear threats. The security checkpoint can also perform long range facial recognition and detect suspected terrorists. The security checkpoint combines many threat detection technologies into one checkpoint that allows it to be robust and detect a large variety of threats including hidden weapons, explosives, dirty bombs, and other threats.

19 Claims, 5 Drawing Sheets

Related U.S. Application Data

14/259,603, filed on Apr. 23, 2014, now Pat. No. 9,330,549.

(60) Provisional application No. 62/211,707, filed on Aug. 29, 2015, provisional application No. 61/905,940, filed on Nov. 19, 2013, provisional application No. 61/945,921, filed on Feb. 28, 2014.

(56) References Cited

U.S. PATENT DOCUMENTS

| | | | |
|---|---|---|---|
| 2011/0058645 A1* | 3/2011 | Heuscher | A61B 6/032 378/16 |
| 2011/0167936 A1* | 7/2011 | Sagi-Dolev | G01V 5/0008 73/865.8 |
| 2012/0172954 A1* | 7/2012 | Zastrow | A61N 5/025 607/101 |

* cited by examiner

MULTI-THREAT DETECTION SYSTEM

CROSS-REFERENCE TO RELATED APPLICATIONS

The present patent application claims priority to U.S. provisional application 62/211,707 filed on Aug. 29, 2015; it is also a Continuation-in-part of U.S. patent application Ser. No. 14/160,895 filed on Jan. 22, 2014, currently allowed; it is also a Continuation-in-part of U.S. patent application Ser. No. 13/528,412 filed on Jun. 20, 2012.

FIELD OF THE INVENTION

This invention is in the field of multiple threat detection systems. Particularly this invention is in the field of detecting concealed or hidden improvised explosive devices (IEDs), metallic weapons and/or shrapnel, and radioactive and nuclear materials.

BACKGROUND ART

The closest threat detection system to present invention is the Rapiscan Systems Secure 1000 SP. The Secure 1000 SP uses backscatter technology as well as image processing software and an operator interface to screen passengers for a wide range of potential threats including liquids, contraband, ceramics, explosives, narcotics, concealed currency and weapons. The Secure 1000 SP generates a front and back scan simultaneously. The Secure 1000 SP can detect small objects and threats concealed on a passenger. It can detect organic and inorganic threats, metals and non-metallic objects and can detect concealed liquids, ceramics, weapons, plastic explosives, narcotics, metals, contraband, currency etc. The Secure 1000 SP requires one pose with no additional movement by the passenger, a full scan can be completed in seconds. The Secure 1000 bounces very low dose of x-rays off of a person to generate an image. This image is then analyzed by an operator to identify concealed potential threats.

The Rapiscan Systems Secure 1000 is limited in that it requires a person to be in a single pose for scanning, it requires an operator to determine what threats are present and to review the scanned images, it uses x-rays for scanning, it only performs backscatter and no pass through imaging, at it is designed to work at a security checkpoint as opposed to use in an array where it can scan multiple individuals and their luggage without causing a security bottleneck. The Rapiscan Systems Secure 1000 is incapable of detecting radiation/nuclear materials.

There is a need for multi-threat detection systems with very short processing time allowing detection of a variety of threats simultaneously.

SUMMARY OF THE INVENTION

The present invention uses microwave detection to find non-metallic objects that are hidden, it uses cross-polarized microwaves to detect hidden metallic weapons or shrapnel, and uses gamma ray detection to find radioactive materials. Each of these technologies provide threat detection, combined these technologies can provide detection of even more types of threats.

The present invention using microwave detection used in conjunction with cross-polarized microwave detection detects IEDs with shrapnel. When using microwave detection, reflective or pass through, dirty bombs are detectable. And the combination of cross polarized microwave detection with gamma detection allows for detection of radioactive/nuclear material that is shielded by metal.

The present invention allows for real time scanning of individuals, multiple individuals at once, for reflected microwave, cross polarized microwave, and radioactive/nuclear scanning either in a security checkpoint or in an open array/portal that people walk through. The devices in an array/portal can be disguised as advertisement space, information boards, etc. The present invention can be used in conjunction with facial recognition software to track a suspicious individual through a given space. The present invention can be use with a limited access entry portal that can isolate an individual to perform subsequent scans in order to determine, automatically, if a threat is detected or if there is a false alarm all while minimally disrupting throughput of the entry portal. The present invention can also be integrated into a system of multiple scan points and use subject tracking in order to perform additional scans and automatically determine threat presence. Furthermore the invention can be practiced in an automatic manner or be reviewed by operators. The invention can also be used to perform pass through and radiation/nuclear scans of rolling luggage, handbags, briefcases, backpacks, etc. The present invention also performs automatic facial recognition from a distance, against a database of known or suspected terrorists and provide an alert. The present invention provides different alerts based upon the types of materials found.

An appreciation of other aims and objectives of the present invention and a more complete and comprehensive understanding of this invention may be achieved by referring to the drawings, and by studying the description of preferred and alternative embodiments.

BRIEF DESCRIPTION OF THE DRAWINGS

The present invention will now be discussed in further detail below with reference to the accompanying figures in which:

FIG. 3 (*b*) shows an example of the location of explosives on the human body under the coat or other garment. FIGS. 3(*c*) and 3(*d*) show the optical paths and distances measured or calculated by the claimed invention in the case of hidden objects.

DETAILED DESCRIPTION OF THE PREFERRED EMBODIMENTS

As radio waves travel through the air, they travel in a way similar to waves of water moving across the surface of the ocean. The shape of a simple radio signal can be depicted as a repeated up and down movement or vibration. This up and down motion of the wave takes place in three dimensions. A wave which is polarized parallel to the plane of propagation is called a horizontally polarized wave. A wave which is polarized perpendicular to the plane of propagation is called a vertically polarized wave. The height or intensity of the wave is called the amplitude of the wave. The idea of polarization is applicable to all forms of transverse electromagnetic waves, whether they are radio waves at microwave frequencies, or light waves such as those emitted by a flashlight.

The power levels radiated by the present invention are much lower than conventional radar systems or than those generated by x-ray or other imaging systems that are currently employed to detect objects at the entry of an airport or a courtroom. In general, some of the preferred embodiments of the invention operate in the MHz or GHz frequency bands. Different radio or microwave frequencies offer different benefits and disadvantages for the object detection provided by the present invention. Although the description of some embodiments of the invention include specific references to particular frequency ranges, the system may be beneficially implemented using a wide variety of electromagnetic radiation bands.

Figure 1:
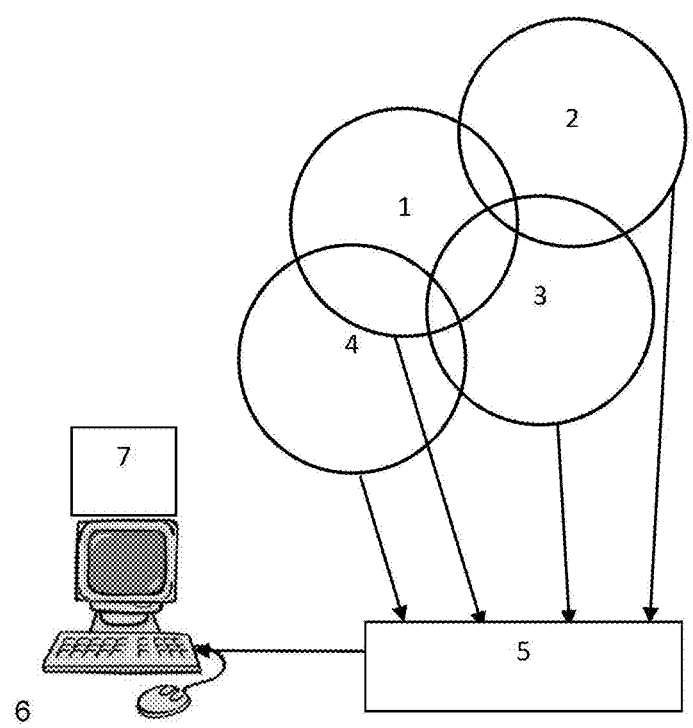
FIG. 1 provides a schematic block diagram of multi-threat detection system.

FIG. 1 presents a schematic block diagram of the system: a block 1 detecting a first threat, which is explosives or improvised explosive device (IED); a block 2 detecting a second threat which is metal weapon; and block 3 detecting a third threat 3 which is radioactive and nuclear material. Those blocks share certain sensors or other elements to obtain data related to all threats thus creating an interleaved united system. All data from all three blocks enters a processing unit 5, where it is processed simultaneously. The results of the processing are visualized in computer 6. The computer 6 is connected to alarm system 7 to provide audio and/or visual alarm in the case of potential threat. The alarm has an ability to indicate what type of threat is detected.

To facilitate the detection, in one embodiment, the system also includes a face recognition unit 4 (FIG. 1), which compares a checked person face with images of faces from a database of known members of terrorist organizations.

Below we disclose various embodiments of the blocks 1-4 below and the ways they are interconnected. In the following description, for purposes of explanation, specific examples are set forth to provide a thorough understanding of the present invention. However, it will be apparent to one skilled in the art that these specific details are not required in order to practice the present invention. The same techniques can easily be applied to other types similar systems.

Block 1

Block 1 makes it possible to remotely determine the dielectric permittivity of a moving, irregularly-shaped dielectric object. The dielectric permittivity of a dielectric object is determined when the object is placed against the background of a reflector. The method includes recording a 3D microwave and a 3D optical range images of an interrogated scene at the same time moment, digitizing all images and overlapping them in one common coordinate system; determining a space between the microwave and optical image (as described below), calculating a dielectric permittivity $\in$ of the space; and concluding the absence of hidden dielectric object where the dielectric permittivity is less than a threshold value. If the dielectric permittivity is in the fixed range (for example 2.9-3.1), then the conclusion is made on the presence of a hidden object.

Figure 2:
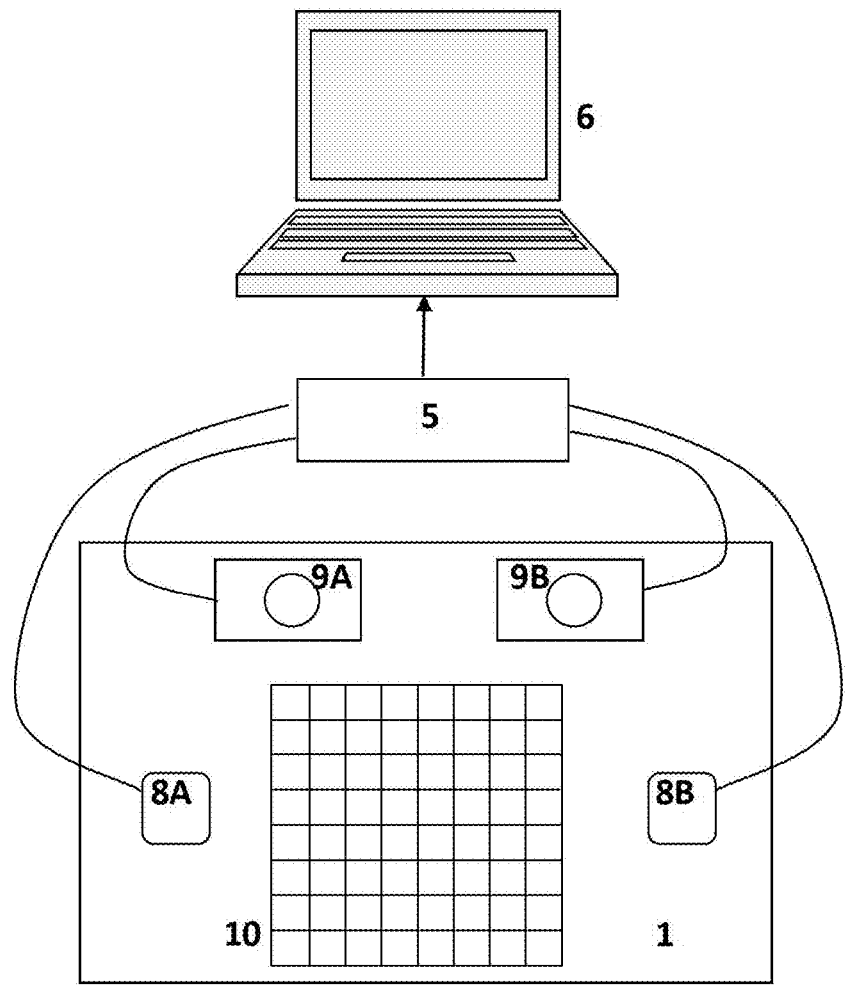
FIG. 2 shows a detailed schematic of threat detection block 1, the active microwave detection system.

FIG. 2 shows the schematics of the first block 1 for Active Microwave Detection (AMD). The interrogated space is digitally scanned with microwave radiation using two or more elemental microwave emitters 10. The signal reflected from the monitored area is picked up by one or more parallel microwave detectors 8A and 8B. The received signal undergoes coherent processing in digital signal processing unit (DSP) 5 to obtain maximum intensity values of the restored configuration of scattering objects in the monitored area, depending on the distance from the elemental emitters to the target. The information obtained after processing is then displayed on the computer 6 by constructing a microwave image corresponding to a three-dimensional surface. A video image of the target is also obtained using two or more video cameras 9A and 9B which are synchronized with the microwave emitters 10 via the processing unit 5. The obtained video images are transmitted into the processing unit and are further converted to its digital form, and a three-dimensional image of the target is constructed and displayed on the display 6.

The AMD operates by sending microwaves (in centimeters range) towards a moving target (e.g., a person), and detecting the reflected waves afterwards. The data analysis is carried out in real time by high-speed GPUs to obtain the image of a potentially hidden object and receive information about its volume and dielectric properties, which allows distinguishing between a common object and a potential explosive. This information is then used to automatically assign a threat level to the found 'anomaly' without an operator's involvement.

A system for unveiling a dielectric object in an interrogated space is disclosed, wherein the interrogated space is located between an inner layer and an outer layer, comprising at least two microwave (MW) sources and at least one MW receiver forming 3D MW images of the interrogated space, wherein said 3D microwave images are formed by emitting MW signals from the MW sources towards the interrogated space, wherein each MW signal partially reflects off the outer layer (first boundary in FIG. 3) and the remainder of the MW signals travels through the intermediary space, where the reminder of the MW signals partially reflects off the inner layer (second boundary in FIG. 3), where said MW receiver receives reflected signals from said outer and inner layer, further comprising a computer/calculator which is adapted for determining at least two distances P1 and P2, between at least two sets of points, where P1=(A2−A1) and P2=(B2−B1); wherein A1 is a point of a first MW beam reflected from the outer layer, and A2 is a point of the same first MW beam reflected from the inner layer, wherein B1 is the point of a second MW beam reflected from the outer layer, and B2 is a point of the same second MW beam reflected from the inner layer (FIG. 4a and c), wherein the at least two sets of two points are spaced from each other by a predetermined value S; and which is further adapted for calculating the difference D between P1 and P2 and comparing the difference D with a predetermined threshold value T; and further comprising an alarm adapted for indicating a likelihood of a hidden dielectric object between the inner and the outer layer, if the difference between P1 and P2 is greater than a threshold value T.

Also, a method for unveiling hidden objects in an intermediary space is disclosed, wherein the intermediary space is located between an inner layer and an outer layer, comprising sending microwave (MW) signals from MW sources towards the interrogated space, the signals being partially reflected on the outer layer and partially on the inner layer, receiving at a MW receiver a first and a second response of MW signals reflected back from the outer and the inner layer; the first and the second response signals corresponding to a first and a second 3D MW image, wherein the first 3D MW image corresponds to the outer layer of the interrogated space, and the second 3D MW image corresponds to the inner layer of the interrogated space, determining at least two distances, P1 and P2, where P1=(A2−A1) and P2=(B2−B1); where A1 is a point of a first MW beam reflecting from the outer layer and A2 is a point of the same first MW beam reflecting from the inner layer, where B1 is the point of a second MW beam reflecting from the outer layer and B2 is a point of the same second MW beam reflecting from the inner layer, wherein A1 and B1 are spaced from each other by a predetermined value S; calculating the difference D between P1 and P2, comparing the difference D with a predetermined threshold value T; indicating if the difference D is greater than the threshold value T. In one embodiment, the method further comprises determining at least a third and a fourth distance P3 and P4 from a third and a fourth response signal, where P3=(C2−C1) and P4=(D2−D1), where C1 is the point of a third MW beam reflecting from the outer layer and C2 is a point of the same third beam reflecting from the inner layer, where D1 is a point of the fourth MW beam reflecting from the outer layer, and D2 is a point of the same fourth MW beam reflecting from the inner layer. P3 and P4 can be used to increase reliability of an alarm triggered when the difference D between P1 and P2 is greater than the threshold value T. P3 and P4 can be determined in essentially the same area where P1 and P2 are determined, but using different viewing angels. P3 and P4 can also be used to detect further hidden objects in a different area than where P1 and P2 are determined.

The interrogated space can be between the body of a person and the clothing of this person or between two layers of clothing of a person. The outer layer is preferably formed by the boundary between air and the outer clothing of a person.

3D Microwave Imaging.

Figure 3:
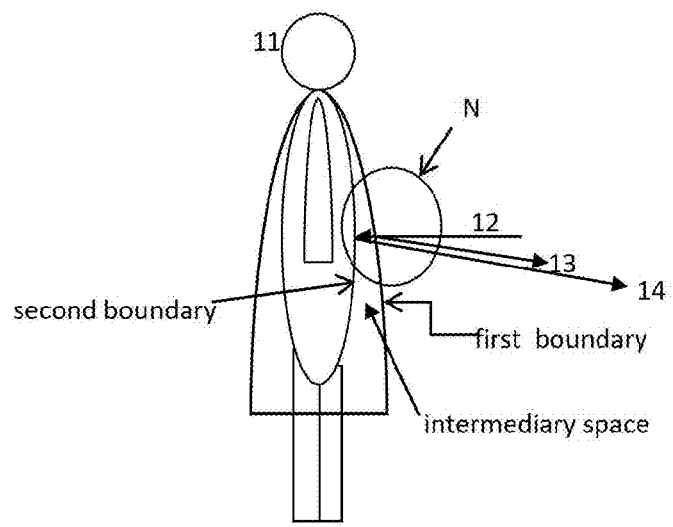
FIG. 3 shows the microwave path and reflection off a target's coat and body boundaries (first and second boundaries, respectively).
Figure 4:
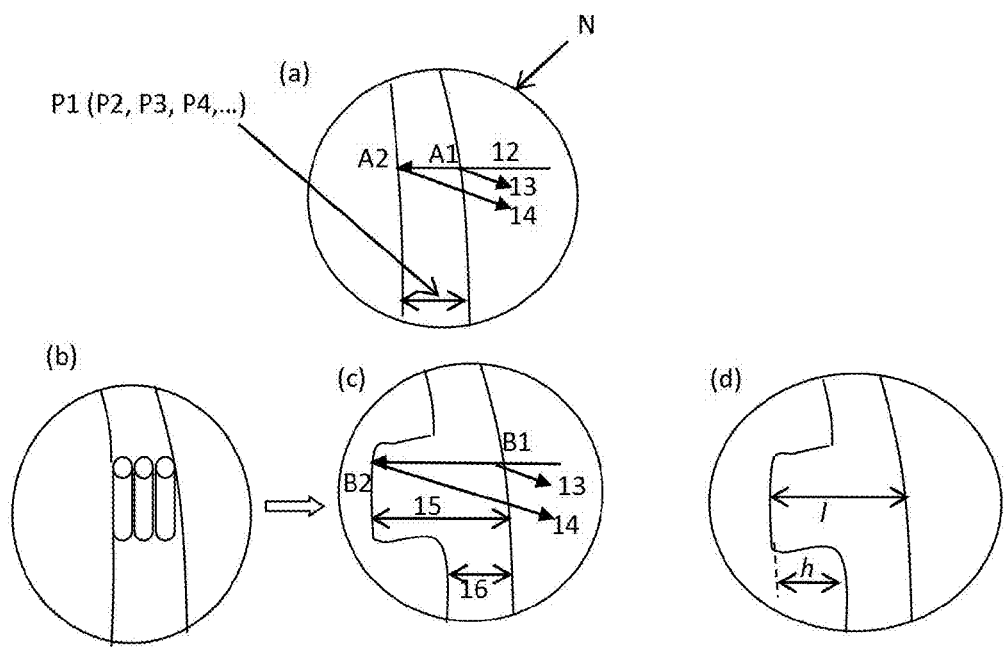
FIG. 4 further details a microwave (MW) beam's reflection in (a) the absence, and (b), (c), (d) the presence of hidden dangerous objects.

Determining the presence of a potentially hazardous object carried by a target 11 is done in the following manner (FIG. 3). Some of the primary emitted MW radiation 12 is partially reflected by the first (outer) boundary (usually the person's coat/jacket/outer garment) forming a reflected beam 13 (see FIG. 4(*a*)—an enlarged view of area N—for greater detail). The same radiation/wave then travels through the coat until reflected by the second (inner) boundary, the human body, forming a second reflected beam 14. Thus, at least two reflections of the same wave occur—one reflection occurs at the outer boundary of the target and/or object (i.e. the first border, or air/intermediary space border) and another reflection occurs after the wave travels through the intermediary space and reflects off the target's body (i.e. the opposite side of the hidden dielectric object, if present). The measured distance P1 of the intermediary space between the first and second boundaries is recorded and used to detect the presence of hidden objects, P1=(A2−A1) is the distance between the point A2 on the second boundary and corresponding point A1 on the first boundary. This process is repeated for measuring of at least one other distance or continuously for measuring of other distances, allowing microwave beams to hit and reflect off of various locations along the first and second boundaries. Each additional microwave beam that reflects off additional locations along the first and second boundaries B1, C1, D1, . . . and B2, C2, D2, . . . allows for measurement of additional distances P2, P3, P4, . . . between first and second boundaries. With microwave signals being emitted and received continuously, 3D microwave images of the inspected area are created. The first 3D MW image corresponds to the first boundary, and the second 3D MW image corresponds to the second boundary. The method allows determining the presence of hidden dielectric objects on the human body under the outer garment or carried by the person. Area N is enlarged and shown in greater detail in FIG. 4(*a*). FIG. 4(*a*) represents a situation without a hidden object. FIG. 4(*b*) illustrates how an explosive might be worn on the body under a coat. In a preferred embodiment of the present invention, the hidden objects are explosive materials of components thereof. In one embodiment the method of the present invention is used to unveil hidden suicide bombs in a crowd of moving people. The dielectric constant of explosives is about three or larger. The MW radiation traveling through a medium with such a high dielectric constant is equivalent to traveling a longer distance in air and thus the microwave image of a hidden object is portrayed as a cavity protruding into the body, as illustrated by FIG. 4(*c*). This seemingly longer distance corresponds to a sharp change of the microwave beam path length, which is detected by the receivers because the MW beam in a first area 15 contains extra path gain compared to the MW beam in a second area 16. By measuring the phase and amplitude of incoming reflected microwaves, the microwave path (i.e. the path of the microwave beam/signal) can be determined and the sudden sharp change of the path in certain areas, if present, is registered. Because a microwave travels more slowly in an object with a higher dielectric (permittivity) constant, a second border signal takes longer to arrive in the presence or area of an object (compared to areas where no object is present, e.g., just above, below, or to either side of an object). If the change in path value exceeds a preset threshold value, it serves as an indication that a hidden object is present.

In the preferred embodiment, the threshold value T is system resolution in depth in the direction perpendicular to the first and the second boundaries (i.e. the outer and inner layers, also called borders). In the preferred embodiment the resolution is equal to 1 cm. The resolution depends on the bandwidth of the MW frequencies used. The resolution is equal to the speed of light in vacuum divided by the doubled bandwidth of the MW frequencies used. Bandwidth of the MW frequencies is typical 15 GHz, which thus means 1 cm resolution in depth.

The additional path, h (see FIG. 4(*d*)), is equal to $h = l((\in^2 - 1)/(\in/2))$, where l is the thickness of the intermediary space, which equals the distance from the first boundary to the second boundary including the cavity, if present, as shown by the first area 15 (see FIG. 4(*c*)), and $\in$ is the dielectric (permittivity) constant of the intermediate space. The additional path, h, is calculated by subtracting the measured value of the second area 16 from the measured value of the first area 15.

The first and the second border signals can be used to reconstruct two 3D MW images of a person, one corresponding to the outer garment and the other corresponding to the human body, as described above. However, the signal received from the first border of an interrogated space, due to its small value, may be disrupted by the side lobes (i.e. secondary maximums) of the signal from the second border. Preferably, a synchronized video image border can additionally be used, if the signal/noise ratio is low (see FIG. 2).

MW radiation can be emitted from various different angles and the reflected radiation, also travelling from various different angles, is similarly processed, allowing for accumulation of additional data to improve the accuracy and resolution of the image and detection process. Various configurations of setups are possible.

Simultaneous 3D Video and MW Imaging.

Additionally, a 3D video image of the target can be recorded at the same time of a MW image. In this preferred embodiment, the method of the invention thus further comprises forming a 3D optical image of the outer layer of the interrogated space, synchronizing the 3D optical image with the location of the points A1, B1 and optionally C1 and D1, determining points A1', B1' and optionally C1" and D1' on the 3D optical image corresponding to the points A1, B1 and optionally C1 and D1, calculating the differences P1'=(A2−A1'), P2'=(B2−B1') and optionally P3'=(C2−C1') and P4'=(D2−D1') and comparing the values P1 with P1', P2 with P2' and optionally P3 with P3' and P4 with P4'. Similarly, in the invention a system as described before is preferred which further comprises at least two cameras recording optical images of the interrogated space and being adapted for forming a 3D optical image of the interrogated space; and a computer which is adapted for synchronizing in time and superimposition and digital space of the 3D optical image with the 3D MW image formed by the at least two microwave sources and at least one microwave receiver of the interrogated space, which is reflected from the outer layer. The reflection signal from the outer layer (points A1 and B1) may be few times weaker compared to the reflected signal from the inner layer (points A2 and B2). Points (A1', B1') from the outer layer extracted from a 3D optical image of the outer layer of the interrogated space (delivered by stereo cameras) can be used to calculate P1' and P2' and compare with P1 and P2.

Preferably, more than 100 microwave sources are used in the method of the present invention. It is also preferable to use microwave sources which have a spectrum comprising multiple frequencies.

Preferably, at least two video cameras 9A and 9B (see FIG. 2) record images of the target, and the DSP unit 5 reconstructs a 3D video image of the object. Optical beams do not penetrate the outer boundary (i.e., the person's outer garment in the example herein). This 3D video imaging is synchronized in time with the 3D microwave imaging. Overlapping the 3D video image over the 3D MW image of the outer border can achieve improved accuracy of the position of the outer border and improved calculation of the additional path, h. In one embodiment, the system is additionally equipped with an automatic alarm, which triggers a sound or a visual alert if the distance h is above a predetermined threshold value and thus the presence of a hidden object(s) is suspected.

In one embodiment the 3D microwave image is formed by illumination of the scene by microwave radiation from one emitter and recording the scene image by at least two microwave detectors. In another embodiment the illumination is performed by at least two separate microwave emitters that illuminate the scene from different angles, and the recording is performed by one microwave detector.

In one embodiment the microwave emitter radiation is a coherent microwave radiation at N frequencies, which optionally can be equidistant. These frequencies are not related to the lines of absorption of the irradiated media.

The 3D optical image is formed by illumination of the scene by optical radiation and recording the scene image by at least two optical detectors. Different types of processing may apply. In the preferred embodiment, a digital signal processor (DSP) performs a coherent processing, which calculates the 3D image taking into account both amplitude and phase information of electromagnetic fields reflected from the interrogated scene.

Block 2

The purpose of Block 2 is to detect hidden metal weapon and metallic shrapnel. When the present invention is used to detect an object like a handgun, the detection is more easily accomplished when the handgun is oriented in a way that presents a relatively larger radar cross section to the detector. For example, a gun that is tucked behind a person's belt buckle so that the side of the gun is flat against the waist presents a larger radar cross section than a weapon holstered on the hip with the gun barrel pointing toward the ground and the grip pointing forward or back. In general, the present invention relies on the physical phenomenon of reflection in which an incident beam of horizontal polarization will be partially reflected back as vertical polarization. The percentage of energy converted to vertical polarization depends on the shape of the weapon in the plane normal to the direction of incidence and sharpness (contrary to flat parts) of different parts of weapon (or shrapnel). If the weapon has a cross sectional shape that has both vertical and horizontal components, then a vertically polarized component will be realized even though the object is irradiated by horizontal polarization.

Measuring the phase of the polarized waves reflected from a person who may be carrying a concealed weapon is important because the polarized waves reflected from a concealed weapon and the polarized waves reflected from a human body behave quite differently. In general, the reflections from a concealed weapon, while not constant, vary within a relatively confined range. In contrast, the reflections from a human body are chaotic. A preferred embodiment of the invention exploits this generalized phenomena by using signal processing methods to distinguish the relatively well-behaved signals from a concealed weapon from the generally unpredictable signals from a human body.

Figure 5:
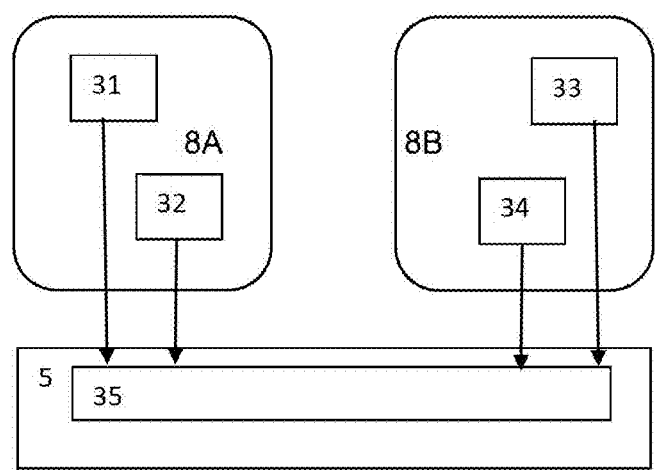
FIG. 5 detectors in the cross-polarization method of the present invention.

The present invention incorporates the apparatus depicted in FIG. 2 to measure amplitude and phase of the returned cross-pole signal. Microwave receivers 8A and 8B include two detectors each as shown in FIG. 5. Detectors 31 and 32 register received microwave radiation with vertical polarization and detectors 32 and 34—with horizontal polarization. In one embodiment this is achieved by placing corresponding polarization filters in front of the receivers. Data from the detectors 31-34 enters processing component 35, which is a part of the processing unit 5.

The present invention reconstructs a 3D MW image and compares amplitudes of reflected co- and cross-polarization waves in many places/zones of the human body simultaneously and in real time. This allows for detection of concealed weapons, shrapnel, or other items without comparison to pre-stored reference data. In an alternative embodiment of the invention the present invention takes reading of multiple individuals and automatically determines the presence of hidden weapons, shrapnel, or other items simultaneously.

Figure 6:
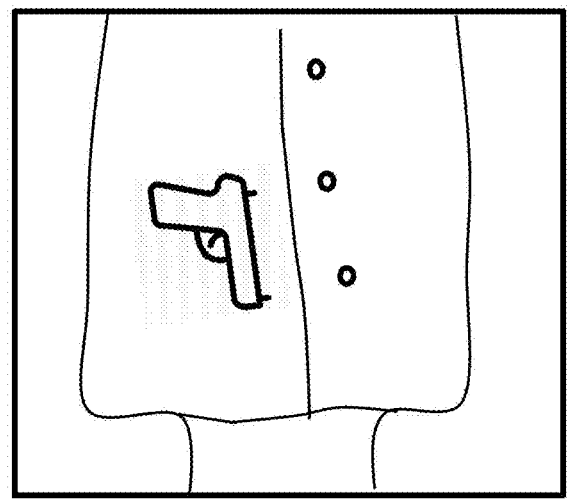
FIG. 6 is a schematic image of hidden metal threat obtained the cross-polarization method of the present invention.

FIG. 6 shows the image at the computer 6 after the data processing in the processing unit 5. The cross-polarization method visualizes the edges of the objects, so a contour of a gun hidden under the coat is revealed.

Obviously, the cross-polarization method partially uses the same equipment (microwave detectors, processing unit, computer, alarm system) as previously described 3D microwave imaging (Block 1) for detection of hidden plastic explosives.

Block 3

Block 3 uses gamma ray detection to find radioactive materials. In the preferred embodiment a spectroscopic device for detecting radioactive and nuclear material is used, which provides an energy spectra of gamma-ray sources detected, thus allowing to eliminate naturally occurring radioactive materials (NORM) and reduce false alarm.

Figure 7:
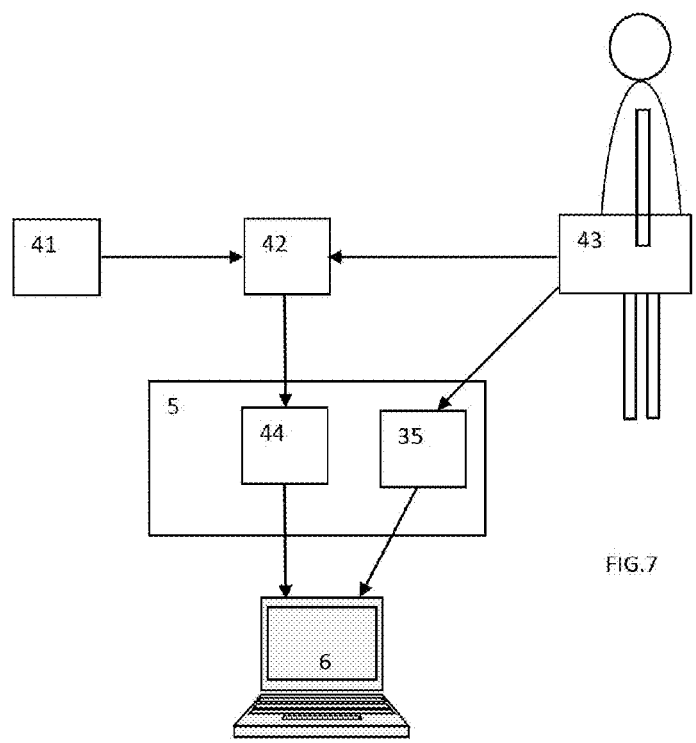
FIG. 7 is a schematic block diagram of the nuclear material detection block 3.

FIG. 7 shows a schematics of hidden radioactive (and nuclear) material detection system according to the present invention. A gamma ray detector 42 fed by a high voltage power supply 41 receives radiation from a source of radioactive radiation hidden in a personal luggage 43. The data from the detectors 42 enters multichannel analyzer 44, which is a part of the processing unit 5.

Figure 8:
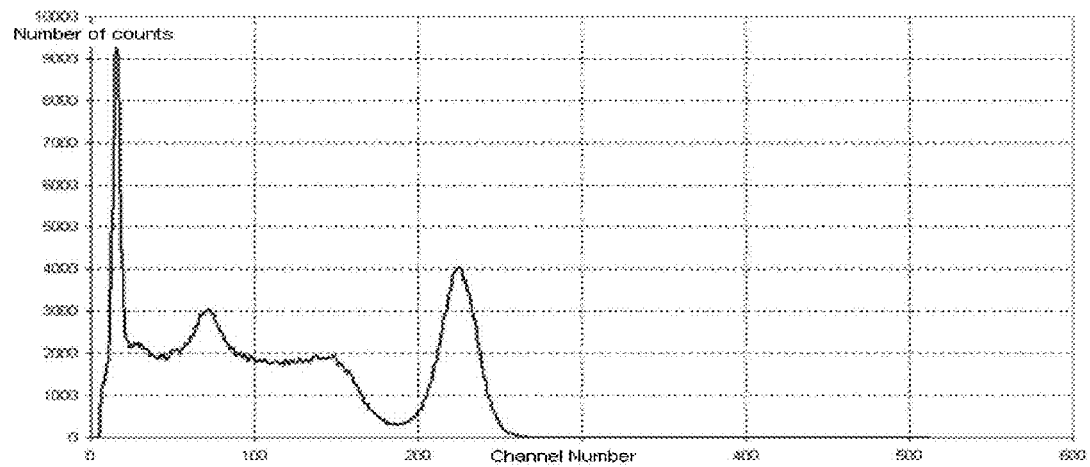
FIG. 8 shows a spectrum of cesium-137 obtained by sodium iodide (NaI) detector (prior art).

In the preferred embodiment scintillation detector is used as gamma ray detector 42. Scintillation detectors use crystals that emit light when gamma rays interact with the atoms in the crystals. The intensity of the light produced is proportional to the energy deposited in the crystal by the gamma ray. The detectors are joined to photomultipliers that convert the light into electrons and then amplify the electrical signal provided by those electrons. Common scintillators include thallium-doped sodium iodide (NaI(Tl))—often simplified to sodium iodide (NaI) detectors—and bismuth germanate oxide (BGO). Because photomultipliers are also sensitive to ambient light, scintillators are encased in light-tight coverings. FIG. 8 shows a spectrum of cesium-137 obtained by sodium iodide (NaI) detector (prior art). The figure shows the number of counts (within the measuring period) versus channel number (related to energy of gamma rays).

Radioactive materials are stored inside sealed metal capsules (preferably heavy metal, like lead). Cross-polarization method (Block 2) is designed for detection of metal objects. The processing unit combines data from the multichannel analyzer 44 and the processing component 35 (FIG. 7) to increase the reliability of the radioactive (and nuclear material) detection.

Block 4

Block 4 provides face recognition based on comparing the face image obtained by cameras 9A and 9B (also used in Block 1) with a database of known suspicious people. Any know technique can be used for the data processing. For example, U.S. Pat. No. 6,301,370 discloses an image processing technique based on model graphs and bunch graphs that efficiently represent image features as jets. The jets are composed of wavelet transforms and are processed at nodes or landmark locations on an image corresponding to readily identifiable features.

Combination of Block 1, 2, 3 and 4 is unique and advantageous. It provides simultaneous processing of various threats in real time for check point in public places such as airports, subway, etc.

The present invention generally describes apparatuses, including portals and detectors for detecting hazardous and/or radioactive materials, and methods for signal processing, decision making and/or for using the apparatuses. It should be understood that these apparatuses and methods are adapted to be used on a variety of subjects and in a variety of settings, including people, packages, conveyances, buildings, outdoor settings, and/or indoor settings. Also, within the scope of the invention is firmware, hardware, software and computer readable-media including software which is used for carrying out and/or guiding the methodologies described herein, particularly with respect to radioactive (and nuclear) threat detection. Hardware optionally includes a computer, the computer optionally comprising a processor, memory, storage space and software loaded thereon. The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. When used in the following claims, the terms "comprises", "includes", "have" and their conjugates mean "including but not limited to". The scope of the invention is limited only by the following claims.

What is claimed is:

1. A complex security checkpoint, comprising:
a block 1 for detecting a first threat the first threat comprising explosives or an Improvised Explosive Device (IED);
a block 2 for detecting a second threat, the second threat comprising metal weapons;
a block 3 for detecting a third threat, the third threat comprising radioactive and/or nuclear material;
a processing unit receiving data from all three blocks and determining a presence of any threat;
wherein data from block 1 is used in determining the first and second threats, wherein the data from block 2 is used to determine the second and third threats, and the data from block 3 is used to determine the third threat;
an alarm, said alarm starting in case of a suspected threat presence; the alarm differentiating a type of the threat, the type of the threat being said first threat, said second threat, said third threat, or a combination thereof;
wherein block 1 performs a measurement of a phase delay of a radiation and an amplitude of a radiation;
wherein the radiation is irradiated by one or more transmitters, and
wherein the phase delay and any amplitude changes are caused by two or more of: (1) the radiation being reflected by a garment, (2) the radiation travelling through the garment and being reflected by a human body, and (3) the radiation passing through the garment and an unknown object and being reflected by the human body.

2. The checkpoint of claim 1, further comprising:
a block 4 for performing a facial recognition of a subject face;
wherein the processing unit compares an obtained data about the subject face with a database; and
wherein the alarm indicates, if a match exists between said obtained data and said database, a fourth threat comprising information that the subject face matches said database.

3. The checkpoint of claim 1, wherein the explosives are plastic explosives hidden under a garment; and the block 1 performs measurement of a phase delay of a microwave (MW) radiation and an amplitude of a microwave (MW) radiation.

4. The checkpoint of claim 3, wherein a presence of the first threat is determined by a difference in the phase delay in the MW radiation reflected from the human body compared to the phase delay in the MW radiation reflected from the garment, and if the difference indicates an occurrence of a medium with a dielectric permittivity greater than 3, then a presence of the first threat is suspected.

5. The checkpoint of claim 3, wherein a presence of the first threat is determined by a difference in the phase delay in the MW radiation passed through a space between the garment and the human body and the phase delay in the MW radiation passed through the same distance without a presence of any objects in said space, and if the difference indicates an occurrence of a medium with dielectric permittivity greater than 3, then a presence of the first threat is suspected.

6. The checkpoint of claim 1, wherein the transmitters irradiate the radiation in a cone angle more than 50 degrees thus covering a whole checking zone simultaneously without any mechanical movements of the transmitter.

7. The checkpoint of claim 6, wherein the checking zone is at least 5 meters×10 meters×2 meters.

8. The checkpoint of claim 6, wherein the processing unit adds a digital lens during data processing thus creating a set of virtual parallel MW beams which simultaneously illuminate the checking zone.

9. The checkpoint of claim 8, wherein at least one transmitter comprises a matrix of at least 16 emitters×16 emitters.

10. The checkpoint of claim 8, further comprising at least two transmitters and at least one MW receiver; wherein a data obtained by the at least one MW receiver provides information about the checking zone such that no areas within the checking zone are hidden from view.

11. The checkpoint of claim 3, wherein block 2 receives the MW radiation using a first polarization receiver; the first polarization receiver includes a first polarizer which passes through only MW radiation with polarization turned 90 degrees compared to an initial polarization of the radiation irradiated by the transmitters.

12. The checkpoint of claim 11, further comprising a second polarization receiver; the second polarization receiver includes a second polarizer which passes through only MW radiation with polarization which is the same as the initial polarization of the radiation irradiated by the transmitters, and wherein the processing unit overlaps images obtained with orthogonal polarizations and provides a position of the threat.

13. The checkpoint of claim 12, wherein the second polarization receiver is the same receiver as a receiver used for data collection in block 1.

14. The checkpoint of claim 11, wherein the explosives are plastic explosives with metal inclusions or shrapnel, wherein simultaneously the blocks 1 and 2 produce data, and said data leading to the alarm indicating both threats 1 and 2.

15. The checkpoint of claim 11, further comprising at least one video camera; wherein the processing unit overlaps a MW image and a video image; and wherein a probability of the first threat is increased if an object causing the alarm is located near a waist area of the subject.

16. The checkpoint of claim 11, wherein the processing unit compares a response of a metal object causing an alarm with a database of responses to a metallic threat.

17. The checkpoint of claim 1, wherein block 3 includes a spectroscopic device for detecting radioactive and/or nuclear material, which provides an energy spectra of gamma-ray sources detected, thus allowing to eliminate naturally occurring radioactive materials and reduce a false alarm.

18. The checkpoint of claim 17, wherein the block 1 detecting a presence of explosive material, and the alarm indicates simultaneous presence of the threat 1 and 3 pointing to dirty bombs.

19. The checkpoint of claim 1, wherein the alarm is an audio alarm, a visual alarm, or a combination thereof.

* * * * *